Oct. 4, 1960    H. W. RAMEY    2,954,604
METHOD FOR FORMING A PIPE FITTING
Filed Sept. 6, 1955

INVENTOR.
Harold W. Ramey
BY C. E. Stratton
ATTORNEY

United States Patent Office 2,954,604
Patented Oct. 4, 1960

2,954,604

METHOD FOR FORMING A PIPE FITTING

Harold W. Ramey, Los Angeles, Calif., assignor to R. H. Baker & Company, Incorporated, Los Angeles, Calif., a corporation of California Filed Sept. 6, 1955, Ser. No. 532,587

7 Claims. (Cl. 29—421)

This invention relates to a method of producing pipe fittings and deals more particularly with a method for producing fittings used in pipe lines under internal and usually hydraulic pressure.

It has been found advantageous in the fabrication of pipe line fittings to make them of a material, copper, for instance, that has a high tensile strength with relation to the yield point. Copper has a yield point of about twelve thousand pounds per square inch, whereas the tensile strength of this metal is between thirty to thirty-two thousand pounds per square inch. Thus, the ratio of yield point to tensile strength of this metal approaches one to three. Therefore, this metal is capable of considerable expansion under pressure before the tensile strength thereof is exceeded.

Thus, a straight cylindrical tube of copper will remain dimensionally stable under normal pressure conditions providing the hoop strength, as calculated at the yield point, is not exceeded. It is commonly known that, if a branch tube of comparable size is cut to the tube, localized stresses are set up under a given hydraulic pressure to cause distortion in said area. Such distortion may not, ordinarily, be important if the same did not also cause disturbing distortion of the ends of the tube—a distortion that frequently prevented effectively sealing the end of said tube to a connecting tube.

Of course, distortion under pressure may be eliminated by using metal of such great thickness as not to yield under the greatest pressures used, or by providing ribs or other reinforcements on the walls of the fitting. The economical undesirability of such well-known ways of resisting fitting distortion is deemed clear.

Recognizing that thin-walled intersecting tubes such as crosses may become distorted under pressure to impair usefulness, it is an object of this invention to provide a novel and improved method for rendering such fittings dimensionally stable while retaining the pipe-connecting ends thereof properly aligned and undistorted.

It has been common practice to expand fittings and other vessels that are designed to be subjected to pressures beyond the unexpanded yield point of the metal used and, thereby, take advantage of the increased strength that results from metal hardening due to expansion. Dimensional stability being unimportant in such expansion, the vessels in question were initially made undersize and expanded to the approximate size desired but primarily to achieve the increased metal strength that results from expansion.

Another object of the invention is to provide a method in which an article of copper or similar metal hardens as the same is expanded to a dimensionally stable form.

My invention also has for its objects to provide method steps that are novel for the purpose and which may be economically applied in the production of hydraulically-expanded fittings.

The invention also comprises novel method steps, singly or in combination, which will more fully appear in the course of the following description, which is based on the accompanying drawing. Said drawing merely shows and the description merely describes a preferred manner of practicing the invention, the same being given by way of illustration.

In the drawing, like reference characters designate similar parts in the several views.

Figure 1:
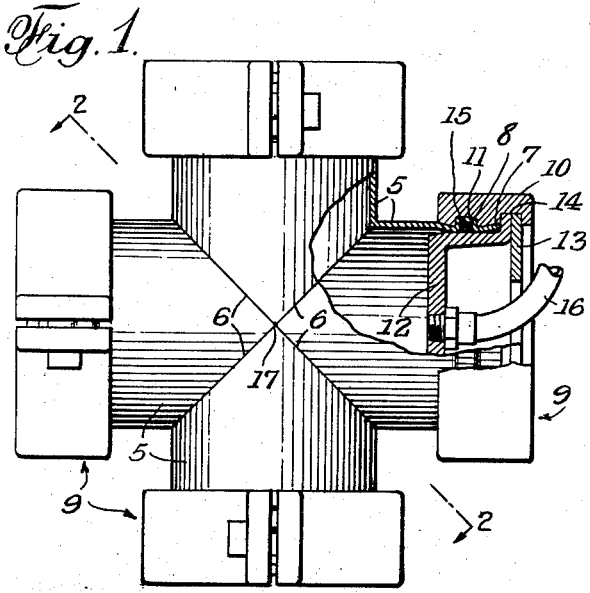
Fig. 1 is an elevational view partly in section, showing a pipe fitting preparatory to expanding the same.
Figure 2:
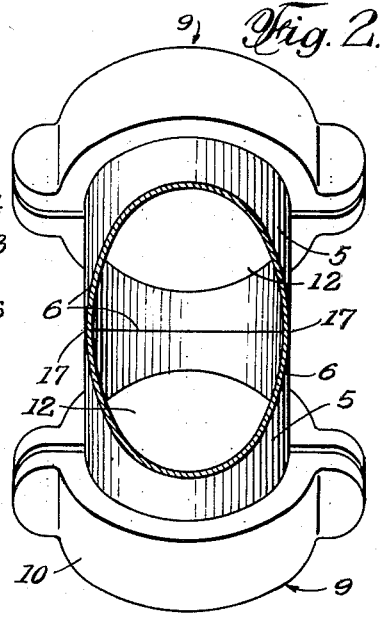
Fig. 2 is a cross-sectional view as taken on line 2—2 of Fig. 1.

The cross fitting shown in Fig. 1 may be an elbow, T, or other fitting in which at least two intersecting or meeting pipes or tubes form the fitting. In this case, the fitting comprises similar cylindrical tubes 5 that intersect along joints 6. It is, therefore, evident that, along joints 6, there is formed an elliptical configuration, as best seen in Fig. 2.

In the present instance, the ends 7 of said tubes are designed to telescopically fit over the end of a connecting pipe. To this end, each said end 7 is provided with an annular channel or recess 8 that is inwardly spaced from the end 7, said recess being adapted to house an O-ring or other gasket that may have sealing engagement with a connecting pipe.

It will be seen that any distortion of seats or recesses 8 out of a normal relationship to the axes of the tubes 5 will result in the gasket in said channel or recess also being distorted to impair efficient sealing. Only when such a gasket is in a single plane and said plane is normal to the axis of the pipe, is leakproof sealing obtainable. When the fitting is made up, care is taken to have the recesses 8 properly aligned.

In order to strengthen the above-described fitting so that it will remain stable under calculated internal pressures, the metal comprising the tubes 5 is selected to have a desired hoop strength at its yield point. Then, by restraining the points which are desired to be held dimensionally (the channels 8), and expanding those localized areas that would ordinarily cause distortion, to the point where no distortion detrimental to the fitting will occur when a calculated pressure is internally applied to the unrestrained parts of the fitting, an expanded fitting as herein contemplated is obtained.

The ends 7 and particularly the channels 8 may be restrained as by using fixtures 9 suggested in the drawing in connection with each tube end. Each such fixture may comprise a split-ring housing 10 that is formed internally with an annular groove 11 adapted to receive the channel 8, an insert member 12 that closes off the end of the tube to contain pressure therein, and a lock plate 13 that cooperates with a grooved portion 14 of the housing to hold the member 12 in place. An O-ring 15 in the groove of channel 8 seals against an annular part of member 12 to prevent leakage of the internal pressure.

One of the fixtures 9 may have a connection 16 made thereto for conducting hydraulic fluid into the interior of the fitting. In this instance, the connection 16 comprises a pipe from a source of hydraulic fluid connected to member 12, as shown in Fig. 1. The other fixtures may be closed off completely except one of them may be provided with a controlled vent to bleed off trapped air.

Said fixtures 9 are shown as separate means. However, they may be connected to a common member or base so as to be immovable, relatively, after connection to the ends 7 of the tubes 5.

Figure 3:
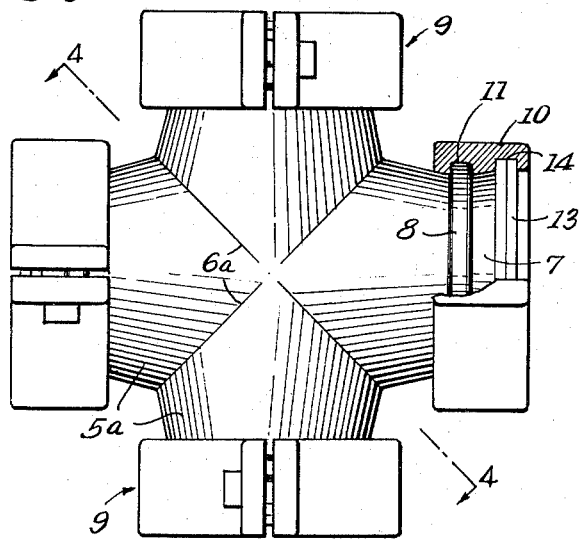
Fig. 3 is a view similar to Fig. 1, showing the fitting expanded according to the invention.
Figure 4:
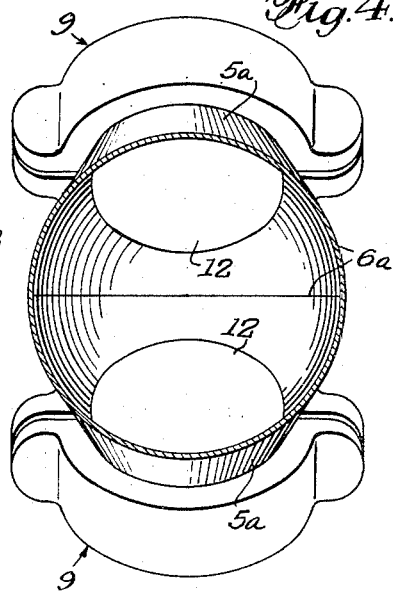
Fig. 4 is a cross-sectional view as taken on line 4—4 of Fig. 3.

With the fixtures firmly in place, hydraulic fluid is introduced into the interior of the fitting through connection 16. The pressure of said fluid is of calculated intensity that is greater than the yield point of the metal used and less than the tensile or ultimate strength thereof. Practice has demonstrated that, keeping the hydraulic pressure at a level about twenty percent below the ultimate tensile strength, the elliptical shape of the fixture along the joints 6 is expanded to a substantially circular shape, as shown in Figs. 3 and 4. This circular shape need not be fully achieved but, in any case, is approached as the fitting is expanded, as indicated.

When the hydraulic pressure is first applied, the opposite sides 17 of the fitting, being on the short axis of the sectional form that lies in the plane of line 2—2, are forced apart. When the yield point of the metal of said fitting is exceeded, the tubes 5 are stretched from their cylindrical shape of Fig. 1 to the conical form of Fig. 3. Finally, when the limit of tensile strength is approached, the elliptical tubes 5a will join at joints 6a and the latter will either be circular along line 4—4 or approach a circle.

By this application of internal pressure, the metal at the tube ends 7 remains at its initial thickness while the metal at the joints 6a is not only thinner but also harder. Thus, the walls of the tubes 5a have a tapered cross-section.

It will be noted that the foregoing makes no mention of any application of heat to the fitting while the same is being subjected to hydraulic pressure to expand the fitting. In fact, no heat is used and, therefore, the walls of the fitting are cold-worked. As a consequence, the stretch and resultant hardness of the fitting walls, at the end of the forming thereof, remain without change until such time as the fitting has been embodied in a flow line.

While this expansion of the fitting is carried out, the fixtures 9 hold the tube ends 7 against deformation. By holding the fixtures relatively aligned or so interconnecting them as to obviate relative movement thereof, said ends 7 retain their dimensional stability, as contemplated.

Whereas in Fig. 1, the cross-sectional forms of the tubes 8 are circles, the cross-sectional form along the joints between said tubes is elliptical; in Fig. 3 the cross-sectional forms of the tubes 8 are round and the cross-sectional form along the joints between said tubes is or approaches a circle.

It will be clear that the foregoing is true also of elbow, T and other fittings in which at least two tubes meet or intersect. Only such changes that result from using two or more pipes of different diametral size and at varying angles or jointure, need be contemplate as modifying the above.

After forming the fitting in the manner above described, the same may be subjected to pressures at least as great as the hoop strength of the initial tube without possibility of any distortion that may affect the accurary or dimensional stability of the tube ends. Since the tubes have become hardened due to the manner in which they were worked, the fitting is not only stable but strong.

While I have illustrated and described what I now contemplate to be the best mode of carrying out my invention, the same, of course, is subject to modification without departing from the spirit and scope of my invention. I, therefore, do not wish to restrict myself to the particular form disclosed nor the particular method described, but desire to avail myself of all modifications that may fall within the scope of the appended claims.

Having thus described my invention, what I claim and desire to secure by Letters Patent is:

1. A method for strengthening the intersection of a pipe fitting comprising two intersecting pipes each having cylindrical walls made of thin ductile metal of uniform thickness between the ends, said method consisting in plugging the ends of the fitting and confining said ends against stretch and distortion while the walls of the fitting between the ends remain unconfined, and then while the fitting is unheated placing the interior of the walls of the fitting under hydraulic pressure exceeding the yield point of said metal walls and substantially lower than the ultimate strength of said metal walls to cold work the walls of the fitting to simultaneously stretch and harden the metal thereof.

2. A method for strengthening the intersection of a pipe fitting comprising two intersecting pipes each having cylindrical walls made of thin ductile metal of uniform thickness between the ends, said method consisting in plugging the ends of the fitting and confining said ends against stretch and distortion while the walls of the fitting between the ends remain entirely unconfined, and then while the fitting is unheated placing the interior of the walls of the fitting under hydraulic pressure exceeding the yield point of said metal walls and substantially lower than the ultimate strength of said metal walls to cold work the walls of the fitting to simultaneously stretch and harden the metal thereof.

3. A method for strengthening the intersection of a pipe fitting comprising two intersecting pipes each having cylindrical walls made of thin ductile metal of uniform thickness between the ends, said method consisting in plugging the ends of the fitting and confining said ends against stretch and distortion while the walls of the fitting between the ends remain unconfined, and then while the fitting is unheated placing the interior of the walls of the fitting under hydraulic pressure exceeding the yield point of said metal walls and substantially lower than the ultimate strength of said metal walls to cold work the walls of the fitting to simultaneously change the cylindrical form of the walls to a conical form tapering toward the ends and to stretch and harden the metal thereof.

4. A method for strengthening the intersection of a pipe fitting comprising two intersecting pipes each having cylindrical walls made of thin ductile metal of uniform thickness between the ends, said method consisting in plugging the ends of the fitting and confining said ends against stretch and distortion while the walls of the fitting between the ends remain unconfined, and then while the fitting is unheated placing the interior of the walls of the fitting under hydraulic pressure exceeding the yield point of said metal walls and substantially lower than the ultimate strength of said metal walls to cold work the walls of the fitting to simultaneously stretch and harden the metal thereof, the maximum applied pressure being lower than the ultimate strength of the intersection thereof and said maximum pressure being about twenty percent lower than the ultimate strength of said walls.

5. A method for strengthening the intersection of a pipe fitting comprising two intersecting pipes each having cylindrical walls made of thin ductile metal of uniform thickness between the ends, said method consisting in plugging the ends of the fitting and confining said ends against stretch and distortion while the walls of the fitting between the ends remain unconfined, and then while the fitting is unheated placing the interior walls of the fitting while the fitting is at room temperature under hydraulic pressure exceeding the yield point of said metal walls and substantially lower than the ultimate strength of said metal walls to cold work the walls of the fitting to simultaneously stretch and harden the metal thereof.

6. A method for strengthening the intersection of a pipe fitting comprising two intersecting pipes each having cylindrical walls made of thin ductile metal of uniform thickness between the ends, said method consisting in plugging the ends of the fitting and confining said ends against stretch and distortion while the walls of the fitting between the ends remain unconfined, and then while the fitting is unheated placing the interior of the walls of the fitting while the fitting is at room temperature under hydraulic pressure exceeding the yield point of said metal walls and substantially lower than the ultimate strength of said metal walls to cold work the walls of the fitting to simultaneously stretch and harden the metal thereof, and releasing the cold working pressure while the fitting remains at room temperature.

7. A method according to claim 1 in which the fitting ends are on axes disposed in a common plane and the coplanar alignment of said axes is substantially maintained during the application of expanding pressure.

References Cited in the file of this patent

UNITED STATES PATENTS

| | | | |
|---|---|---|---|
| 653,279 | Barthels | July 10, | 1900 |
| 714,903 | Hinds | Dec. 2, | 1902 |
| 977,740 | Higgins | Dec. 6, | 1910 |
| 1,182,360 | Dies | May 9, | 1916 |
| 1,255,562 | Olson | Feb. 5, | 1918 |
| 1,542,983 | Bergmann | June 23, | 1925 |
| 1,884,589 | Davies | Oct. 25, | 1932 |
| 1,941,174 | Jensen | Dec. 26, | 1933 |
| 2,214,226 | English | Sept. 10, | 1940 |
| 2,222,762 | Debor | Nov. 26, | 1940 |
| 2,670,224 | Markl | Feb. 23, | 1954 |
| 2,699,959 | Zallea | Jan. 18, | 1955 |
| 2,715,377 | Gary | Aug. 16, | 1955 |
| 2,725,620 | McGrath | Dec. 6, | 1955 |

FOREIGN PATENTS

| | | | |
|---|---|---|---|
| 276,247 | Great Britain | Aug. 25, | 1927 |